United States Patent

[11] 3,620,925

[72] Inventors Kazuo Mochizuki
 Sunto-gun, Shizuoka-ken;
 Hiroyasu Otsuka, Sunto-gun, Shizuoka-ken; Hideo Katumata, Gotenbe-shi; Tetuo Oka, Machida-shi; Masao Tanaka, Machida-shi, all of Japan
[21] Appl. No. 835,261
[22] Filed June 20, 1969
[45] Patented Nov. 16, 1971
[73] Assignee Kyowa Hakko Kogyo Co., Ltd.
 Tokyo, Japan
[32] Priority June 24, 1968
[33] Japan
[31] 43/43396

[54] PROCESS FOR PURIFYING L-ASPARAGINASE
 15 Claims, No Drawings
[52] U.S. Cl. .................................................. 195/66 A
[51] Int. Cl. .................................................. C07g 7/028
[50] Field of Search ..................................... 195/66 A

[56] References Cited
OTHER REFERENCES

Schwartz et al., National Acad. of Science Proceedings Vol. 56 pp. 1,516– 1,519 (1966).

Rowley et al., Biochem. Biophys. Research Comm. Vol. 28 No. 2, pp. 160– 165 (1967)

Whelan et al., Biochemistry Vol. 27 p. 586 Abstract No. 2082 (Apr. 1968).

*Primary Examiner*—Lionel M. Shapiro
*Attorney*—Craig, Antonelli and Hill

ABSTRACT: The antitumor activity of L-asparaginase produced from the cultured cells of micro-organisms belonging to the genus *Serratia* is retained by a purification process wherein, as one of the steps in the purification procedure, the enzymatic liquid is heated to a temperature of at least 60° C., preferably 60°–70° C., thereby denaturing and rendering ineffective the L-asparaginase-inactivating factors contained in the liquid. A more selective destruction of the inactivating factors can be obtained by adding L-asparagine to the enzymatic liquid.

PROCESS FOR PURIFYING L-ASPARAGINASE

This invention relates to a process for purifying L-asparaginase. More particularly, it relates to a process for obtaining an antitumor enzymatic preparation of high purity by purifying L-asparaginase obtained from, for instance, cultured cells of an L-asparaginase-producing strain belonging to the genus Serratia. Even more particularly, the invention relates to a procedure whereby factors which inactivate L-asparaginase are diminished or eliminated.

L-asparaginase, that is, L-asparagine-amide hydrolase (the enzyme number being 3,5,1,1), is an enzyme which hydrolyzes L-asparagine into L-aspartic acid and ammonia. Its distribution is relatively extensive, but many of the details of its properties are yet unknown. In recent years, much attention has been directed to this enzyme since it has been found that specific types thereof, for example, L-asparaginase contained in the serum of a guinea pig or produced by certain strains of Escherichia coli, are remarkably effective against acute leukemia. However, there have been many obstacles which prevent a mass production of the L-asparaginase enzyme on an industrial scale. Two of the major obstacles are (1) a poor supply of the enzymatic sources because of the limited number of types of antitumor enzymes and (2) the difficulties encountered in obtaining a preparation that is pure enough for pharmaceutical use, which is obtained by purifying the product obtained from said enzymatic sources. These and other difficulties have hindered or blocked the commercial product of the desired enzymes. Accordingly, various solutions to these problems have been sought.

The present inventors previously solved one of the above-mentioned problems concerning the enzymatic sources by developing a method for cultivating a micro-organism belonging to the genus Serratia to give L-asparaginase (Japanese Pat. application No. 9116/68, corresponding to U.S. application Ser. No. 798,443, filed on Feb. 11, 1969). After having continued basic research concerning purification processes for the L-asparaginase enzyme, the present inventors have succeeded in solving the problem of purifying the present enzyme. It was known that L-asparaginase produced by a micro-organism belonging to the genus Serratia is extremely unstable in its partial purification stage and that it lost its activity unexpectedly during the purification procedure, although said L-asparaginase was stable by nature in a wide range of pH values and temperatures. Because of this fact, it was necessary to carry out all of the purification steps very rapidly. Therefore, it was extremely difficult to obtain a high-purity preparation on an industrial scale. No definite answers, however, have been given concerning the causes of these phenomena.

Accordingly, one of the objects of the present invention is to provide a process for the production of L-asparaginase which overcomes the disadvantages and deficiencies of the prior art methods.

Another object of the present invention is to provide a process for producing L-asparaginase economically on an industrial scale in good yield and with high purity.

A further object of the invention is to provide purified enzymatic preparations of L-asparaginase which have a stable antitumor activity.

A still further object of the invention is to provide purified L-asparaginase and a purification procedure for obtaining the same.

These and other objects and advantages of the present invention will become apparent to those skilled in the art from a consideration of the following specification and claims.

As a result of various studies concerning the causes of the above-described loss of activity, the present inventors have discovered that a micro-organism belonging to the genus Serratia produces in its cells a relatively strong factor which inactivates the L-asparaginase simultaneously with the production of L-asparaginase. As a result, the desired L-asparaginase loses its activity during the course of subsequent treatments because these inactivating factors are extracted together with the L-asparaginase when the cells are ruptured. Thus, unless these factors are removed, it is not only impossible to obtain a high-purity preparation of L-asparaginase in good yield, but also a sufficient antitumor effect cannot be obtained with an enzymatic preparation containing said inactivating factors even if the product containing the inactivating factors is purified.

As the result of continued studies concerning a purification process for L-asparaginase, based on the aforementioned findings concerning the basic properties of said inactivating factors, it has been found, in accordance with the present invention, that L-asparaginase can be very easily purified by depriving the activity of said inactivating factors by means of denaturation without impairing the activity of the L-asparaginase. Based on this finding, the present inventors have succeeded in establishing a novel process for the production of highly pure L-asparaginase on an industrial scale.

The process of the invention comprises purifying L-asparaginase obtained from, for example, cells of a strain belonging to the genus Serratia by heating a crude enzymatic aqueous solution thereof under suitable conditions at an appropriate step during the purification procedure, desirably at as early a step as possible. The heating step denatures the L-asparaginase-inactivating factors thermally, with the result that a loss of the desired L-asparaginase activity during the subsequent purification steps can be prevented.

It is known that proteins as well as enzymes are ordinarily denatured by heating and that their biochemical activities are thereby changed. However, the conditions of thermal denaturation and the changes in the biochemical activities caused by denaturation are extremely varied, depending on the particular type of protein. Many new understandings concerning the effect of heating on L-asparaginase and the inactivating factors thereof have resulted from the research in connection with the present invention. For example, the present inventors have found that the inactivating factors quickly lose their activity irreversibly at a temperature of 60° C. or higher and, with heating for 5 minutes or longer, entirely lose their ability to destroy L-asparaginase, while the L-asparaginase remains stable under the temperature condition of 70° C. Furthermore, it has been found that the stability of L-asparaginase against heat is increased in the presence of its substrate, L-asparagine, and that this activity is retained even after a heating treatment for thirty minutes at 70° C., while the inactivating factors are not affected at all by L-asparagine.

The difference in the thermal stability of L-asparaginase and the inactivating factors thereof are shown in table 1.

TABLE 1

| Heating temperature (° C.) | Heating time | | | | | |
|---|---|---|---|---|---|---|
| | 5 minutes | | 30 minutes | | 60 minutes | |
| | Rate of retained L-asparaginase activity (percent) | | | | | |
| | Substrate not added | Substrate added | Substrate not added | Substrate added | Substrate not added | Substrate added |
| Not treated | 0 | 0 | 0 | 0 | 0 | 0 |
| 55 | 3 | 20 | 11 | 32 | 6 | 30 |
| 60 | 88 | 100 | 92 | 110 | 99 | 99 |
| 65 | 90 | 95 | 85 | 110 | 88 | 89 |
| 70 | 80 | 105 | 64 | 95 | 44 | 80 |
| 80 | 5 | 20 | 5 | 20 | 11 | 10 |

Table 1 shows experiments wherein a crude aqueous solution of L-asparaginase containing inactivating factors of pH 8.5 was subjected to a processing at a temperature and for a period of time as specified in the table with or without the addition of the substrate in a concentration of $10^{-2}$M. Thereafter, the liquid was adjusted to a pH value of 5.5, which is the optimum pH for the activity of the inactivating factors, and was allowed to react for two hours at a temperature of 37° C. The L-asparaginase activity of the thus-obtained reaction mixture was measured. Table 1 shows the survival rate (percent) of the L-asparaginase activity of the resultant reaction liquid, based on an L-asparaginase activity of the original sample liquid as being 100.

As can be seen from table 1, the inactivating factors survived heating for 60 minutes when heated at a temperature of 55° C. or lower and destroyed the L-asparaginase almost completely in a 2-hour long reaction at pH 5.5 and at 37° C., similarly as in the case when the sample was not treated. In contrast to this, when heated at a temperature of from 60° to 70° C., even a 5-minute long heating treatment caused a sufficient loss of the effectiveness of the inactivating factors so as to almost completely succeed in preventing a loss of L-asparaginase activity from occurring in the subsequent reactions. When heated at a temperature of 80° C. or higher, a considerable loss of activity of the L-asparaginase itself because of denaturation by heat was also noted. The addition of the substrate, L-asparagine, helped to diminish the thermal loss of L-asparaginase activity and made it easier to achieve the objective of a selective destruction or inactivation of the inactivating factors by widening the difference in thermal stability between the L-asparaginase and the inactivating factors.

In accordance with the invention, it is possible to diminish or destroy the effectiveness of the inactivating factors selectively, as described above, by heating an enzymatic aqueous solution at a temperature of 60° C. or higher, preferably 60°-70 C., in the presence or in the absence of the substrate, L-asparagine. From 5 to 30 minutes are sufficient for said heating treatment. Heating for too long a period of time is not desirable in view of the denaturation of L-asparaginase. The pH of the solution during the heating treatment should preferably range from 8.5 to 11. L-asparaginase is the most stable and the inactivating factors lose their activity completely in this range of pH. When L-asparagine is added to the solution, better results can be obtained. The L-asparagine is preferably added in a concentration of $10^{-2}$M–$10^{-4}$M. The procedure of the present invention is preferably used during the early stages of a purification processing, such as with the crude enzymatic extract. However, it can also be used with a high-purity preparation with a sufficient effect.

The enzymatic purity of a preparation obtained by completely destroying the effect of the inactivating factors in accordance with the invention can be easily raised by various methods ordinarily employed in the art for obtaining pure enzymatic preparations, such as, for example, ion exchange chromatography or other means of chromatography using adsorbing agents. Thus, a preparation useful as a pharmaceutical can be obtained readily in good yield.

Insofar as the composition of the fermentation medium and the culturing method used is concerned, conventional procedures used in fermentation methods are employed in obtaining the L-asparaginase-containing cells. Thus, either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

The fermentation or culturing of the micro-organisms is conducted under aerobic conditions, such as aerobic shaking of the culture or with stirring and aeration of a submerged culture, at a temperature of, for example, about 20° to 40° C. and at a pH of, for example, about 6 to 8. After about 10 to 72 hours of culturing under these conditions, L-asparaginase-containing cells are found to be accumulated in the resultant culture liquor.

After the completion of culturing, the cells can be disrupted in a conventional manner and a crude enzymatic extract liquid collected therefrom. Further treatment is then carried out in accordance with the present invention.

The following example is given merely as illustrative of the present invention and is not to be considered as limiting. Unless otherwise noted, the percentages therein and throughout the application are by weight per liter of water.

EXAMPLE

Serratia marcescens ATCC 60 is cultivated in an aqueous nutrient medium, and the thus-obtained cells are suspended in a 0.01 M tris (hydroxymethyl) aminomethane-hydrochloric acid buffer solution of pH 8.5. The cells are ruptured by treating the solution for 10 minutes by means of a supersonic wave generator of 10 kc. The resultant liquid is subjected to centrifugal separation, and the supernatant liquid is collected, whereby a crude enzymatic liquid having an L-asparaginase activity of 0.1 unit of specific activity is obtained. (The unit of specific activity is an international unit indicating the activity of an enzyme by the number of $\mu$ moles of substrate decomposed by reaction for 1 minute, and this representation of the specific activity is used throughout the present application).

L-asparagine is added to the crude enzymatic extract in a concentration of $10^{-2}$M. Thereafter, the extract is heated for 30 minutes at a temperature of 60° C. The resulting precipitates are removed by centrifugation, whereby a crude enzymatic liquid having a specific activity of 0.4 is obtained.

No loss of L-asparaginase activity because of L-asparaginase-inactivating factors could be found in the resultant crude enzymatic liquid. The proteins precipitated by the addition of ammonium sulfate in a concentration range of 0.3 to 0.7 of saturation are recovered by centrifugal separation. Thereafter, these proteins are again dissolved in a tris(hydroxy-methyl) aminomethane hydrochloric acid buffer solution. After subjecting this solution to dialysis, the resultant liquid is subjected to chromatography with diethylaminoethyl-cellulose and chromatography with Biogel P–200, whereby a purified L-asparaginase preparation having a specific activity of 110 is obtained in a 30 percent yield. This preparation demonstrated an antitumor activity which completely cured an experimental leukemia in a mouse with a dosage of several $\mu$g.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. In a process for purifying L-asparaginase obtained from the cultured cells of an L-asparaginase-producing micro-organism belonging to the genus *Serratia*, the improvement which comprises the step of heating the enzymatic liquid obtained from the culturing of said cells to a temperature of at least 60° C., thereby rendering ineffective the L-asparaginase-inactivating factors without substantially diminishing the enzymatic activity of the L-asparaginase.

2. The process of claim 1, wherein the temperature of heating is about 60° to 80° C.

3. The process of claim 1, wherein the temperature of heating is 60° to 70° C.

4. The process of claim 1, wherein said micro-organism is *Serratia marcescens*.

5. The process of claim 1, wherein said heating step is conducted at an early stage during the purification procedure.

6. The process of claim 1, wherein said heating step is conducted with an L-asparaginase preparation which has been at least partially purified.

7. A process for producing a purified L-asparaginase preparation which comprises culturing an L-asparaginase-producing micro-organism belonging to the genus *Serratia* under aerobic conditions in an aqueous nutrient medium, recovering a crude enzyme-containing liquid from the resultant culture liquor, adding L-asparagine to the liquid, heating the liquid at a temperature of about 60° to 80° C. for a time sufficient to render the L-asparaginase-inactivating factors ineffective, and recovering L-asparaginase therefrom.

8. The process of claim 7, wherein the resultant L-asparaginase is further purified to obtain a highly pure L-asparaginase preparation.

9. The process of claim 7, wherein the temperature of heating is 60° to 70° C.

10. The process of claim 7, wherein approximately $10^{-7.5^{-2}}$ to $10^{-7.5^{-4}}$ mole per liter of L-asparagine is added to said liquid.

11. The process of claim 7, wherein the heating is carried out for about 5 to 30 minutes.

12. The process of claim 7, wherein the pH of the liquid during the heating step is maintained at about 8.5 to 11.

13. The process of claim 7, wherein said micro-organism is *Serratia marcescens*.

14. The process of claim 7, wherein said micro-organism is *Serratia marcescens* ATCC 60.

15. The process of claim 1, wherein said micro-organism is *Serratia marcescens* ATCC 60.

* * * * *